United States Patent [19]

Stephens

[11] Patent Number: 4,777,426

[45] Date of Patent: Oct. 11, 1988

[54] AXIAL-FLOW AERODYNAMIC WINDOW FOR HIGH ENERGY LASER

[75] Inventor: Timothy Stephens, Lexington, Mass.

[73] Assignee: The United States of America as represented by the Secretary of the Air Force, Washington, D.C.

[21] Appl. No.: 22,843

[22] Filed: Mar. 6, 1987

[51] Int. Cl.$^4$ .............................................. H01S 3/22
[52] U.S. Cl. ...................................... 372/104; 372/58; 350/584; 350/588
[58] Field of Search ................... 372/104, 103, 58, 59, 372/89; 350/584, 582, 588, 319

[56] References Cited

U.S. PATENT DOCUMENTS

| | | | |
|---|---|---|---|
| 3,604,789 | 9/1971 | McLafferty | 350/319 |
| 3,873,939 | 3/1975 | Guile et al. | 331/94.5 |
| 3,902,136 | 8/1975 | Finkleman et al. | 331/94.5 |
| 3,918,800 | 11/1975 | Griffin | 372/104 |
| 4,112,388 | 9/1978 | McLafferty | 331/94.5 |
| 4,138,777 | 2/1979 | Kepler et al. | 29/157 |

Primary Examiner—James W. Davie
Assistant Examiner—Xuan Vo
Attorney, Agent, or Firm—Stanton E. Collier; Donald J. Singer

[57] ABSTRACT

The aerodynamic window of the present invention provides a barrier between two different environments of a high energy laser device. The first environment is a transverse gas flow across the laser beam and the third environment is an axial flow beam path. The window having a second environment therein changes both the gas temperature and the gas pressure along the laser beam to minimize optical path differences between the first and third environments. The second environment has a thermal transition section and an injection section. In the thermal transition section before the injection section, a gas manifold provides a varying gas flow field. The thermal transition section changes the gas temperature while maintaining its pressure and velocity constant. A transverse flow is exhausted in a location opposite to the gas manifold. The axial flow enters into the injection section. Gas ejectors in the injection section mix the axial flowing gas and increase the gas pressure and velocity.

2 Claims, 2 Drawing Sheets

AXIAL-FLOW AERODYNAMIC WINDOW FOR HIGH ENERGY LASER

STATEMENT OF GOVERNMENT INTEREST

The invention described herein may be manufactured and used by or for the Government for governmental purposes without the payment of any royalty thereon.

BACKGROUND OF THE INVENTION

This invention relates to the control of the optical quality of the beam path at the output of high energy lasers, and, in particular, to a device for interfacing two different environments which can occur within the beam path, so that there is a tolerable level of optical distortion arising from transverse variations in refractive index.

The invention also relates in particular to the requirement that occasionally arises in the design of such beam control systems for a device which is capable of propelling a moderate flow of the beam conditioning gas along the axis of an extended length of beam duct, in order to provide a forced convection of the heat absorbed from the beam and turbulent mixing to suppress systematic transverse gradients in refractive index.

The alternative to axial flow, for suppression of transverse gradients, is a forced transverse flow of the beam conditioning gas. However this requires relatively large clearances for the ducting of the required flowing gas, and may not be feasible for some portions of the beam path. A most notable example generally occurs within the relatively confined spaces of a beam directing telescope, in which the beam path must be carried through several gimbal axes.

This invention relates primarily to the device that provides the transition that must be made between the environment of a transversely flowing beam path conditioning gas, and the axially-flowing gas that may be injected into the relatively constrained beam path within the beam directing telescope system. The pressure rise that is introduced by such an axial flow injection system is typically a very small fraction of one atmosphere, and is intended to be sufficient only to overcome the flow losses and to withstand variations in the ambient wind pressure that may be incident on the aperture of the beam director. It is not intended to provide the pressure barrier between the atmosphere and the relatively low pressure in the interior of the laser device itself.

One type of device for separating the two gaseous environments is a solid optical window. One major disadvantage of the solid optical window is the degradation of the window itself by the laser beam. Extrinsic factors such as dirt upon the window may cause the coatings used to disintegrate because of increased temperature, especially that in a high energy laser. Intrinsic factors such as defects in coatings and optical material could also lead to the breakdown and catastrophic failure of the window.

Uneven heating of the solid window material can also result in substantial transverse variations in refractive index, and consequent degradation in optical quality. Limitations on the availability of suitable materials in the required sizes and purity has also inhibited the application of solid windows to high energy laser systems. As a result, the use of aerodynamic windows for high energy lasers has been almost mandatory, to avoid such problems.

An example of a transverse flow supersonic aerodynamic window which is capable of withstanding a relatively substantial pressure difference is shown in U.S. Pat. No. 3,873,939. Therein, a conduit having a flowing gas under pressure is connected to an opening in a passageway that has the laser beam therein. An opposing opening receives the flowing gas such that the laser beam is substantially perpendicular to the flow of the gas across the passageway in the conduit. An array of vanes is placed in the entrance of the conduit to promote a vortex-free flow. The gas in the exit conduit can be either exhausted or recirculated to the pump.

The transverse-flow aerodynamic window utilizes the high lateral momentum of the gas flow to create an effective barrier to allow dissimilar gas types, temperatures, and pressure fields to exist on opposite sides of the gas flow.

These drawbacks have motivated a search for alternative devices that would satisfy the above disadvantages and have additional advantages.

SUMMARY OF THE INVENTION

The present invention comprises an axial flow aerodynamic window that has a thermal transition section and an injection section.

The thermal transition section is connected to a conventional transverse flow beam path section of a high energy laser output, which operates at a pressure of approximately one atmosphere. The injection section is downstream of the thermal transition section and is connected to an axial flow beam path section that outputs the laser beam to further devices such as a beam director that points the beam at a specific target.

The injection section has therein a plurality of ejectors for inputting jets of pressurized gas in a downstream direction to mix the flowing gas and to increase the pressure therein.

The thermal transition section has therein a supply tube with pressurized gas therein which flows from a plurality of outlet ports into the thermal transition section. The outlet ports discharge the gas into a plurality of compartments which direct the gas flow perpendicular to the beam that traverses this section. The number and shape of the outlet ports in each compartment can be varied to tailor the flow field.

Additional flow stability from the compartments is achieved by a screen placed upon the output ends of the compartments. Other means can be used such as flow control vanes and/or flow channels.

In order to make a transition from the purely transverse flow to a purely axial flow, the thermal transition section has streamlines that are both transverse and axial in nature. The gas in this section flows out of an exhaust section and into an injection section. At the downstream side of the thermal transition section, a dividing streamline in the flow field marks the point at which the streamline becomes purely axial rather than transverse.

Therefore, it is one object of the present invention to provide an axial flow aerodynamic window for a high energy laser.

A further object of the present invention is to provide an aerodynamic window that changes the gas flow from transverse to axial.

Another object of the present invention is to provide an aerodynamic window that has therein a plurality of ejectors for mixing and pressurizing an axial gas flow.

Another object of the present invention is to provide an aerodynamic window that has therein a gas field that transitions from transverse to axial.

These and many other objects and advantages of the present invention will be readily apparent to one skilled in the pertinent art from the following detailed description of a preferred embodiment of the invention and related drawings.

DETAILED DESCRIPTION OF THE PREFERRED EMBODIMENT

The present invention comprises an aerodynamic window for use in a high energy laser device.

Figure 1:
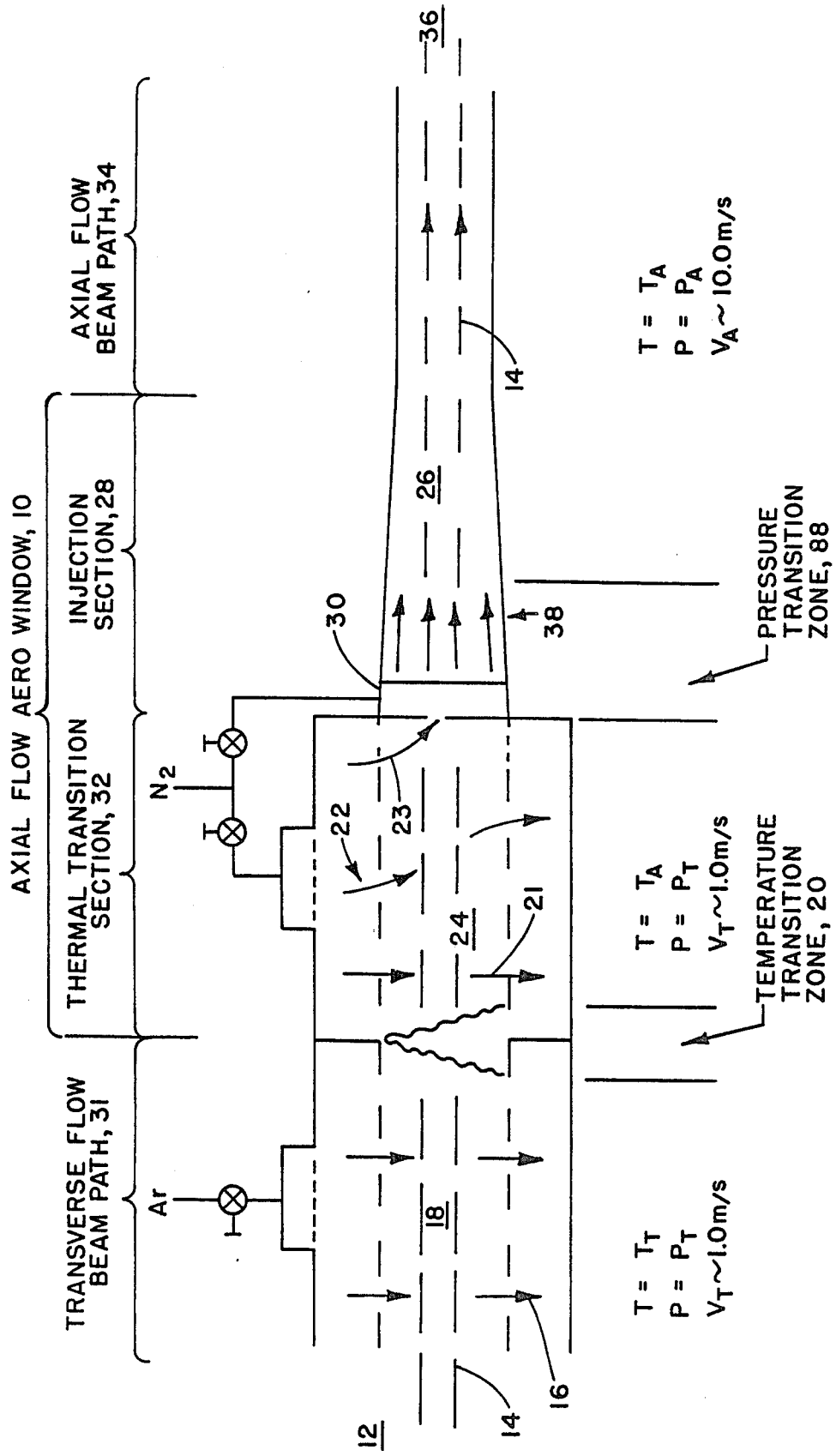
FIG. 1 illustrates schematically an aerodynamic window of the present invention.

Referring to FIG. 1, an aerodynamic window 10 provides an aerodynamic barrier between an upstream gas laser 12, not otherwise shown, outputting a high energy laser beam 14. Beam 14 crosses a conventional transverse gas flow 16 which has established therein a first environment 18 with a temperature, $T_t$, a pressure, $P_t$, and a gas velocity, $V_t$. Beam 14 thereafter crosses a temperature transition zone 20 upon entering into window 10. As seen in FIG. 1, the gas flow field 22 changes from a transverse flow 21 to an axial flow 23. In window 10, a second environment 24 is established with a temperature, $T_a$, pressure, $P_t$, and gas velocity, $V_t$. To change to a third environment 26 having a temperature, $T_a$, a pressure, $P_a$, and a gas velocity, $V_a$, a gas injection section 28 has ejectors 30 which mix the gases and increase the pressure and gas velocity from that in thermal transition section 32 such that beam 14 is in a purely axial flow beam path 34 that is output to a device 36, not shown, having the third environment therein. A pressure transition zone 38 results in this change. As seen in FIG. 1, laser beam 14 crosses three different environments wherein the third has different parameters than the first.

Figure 2:
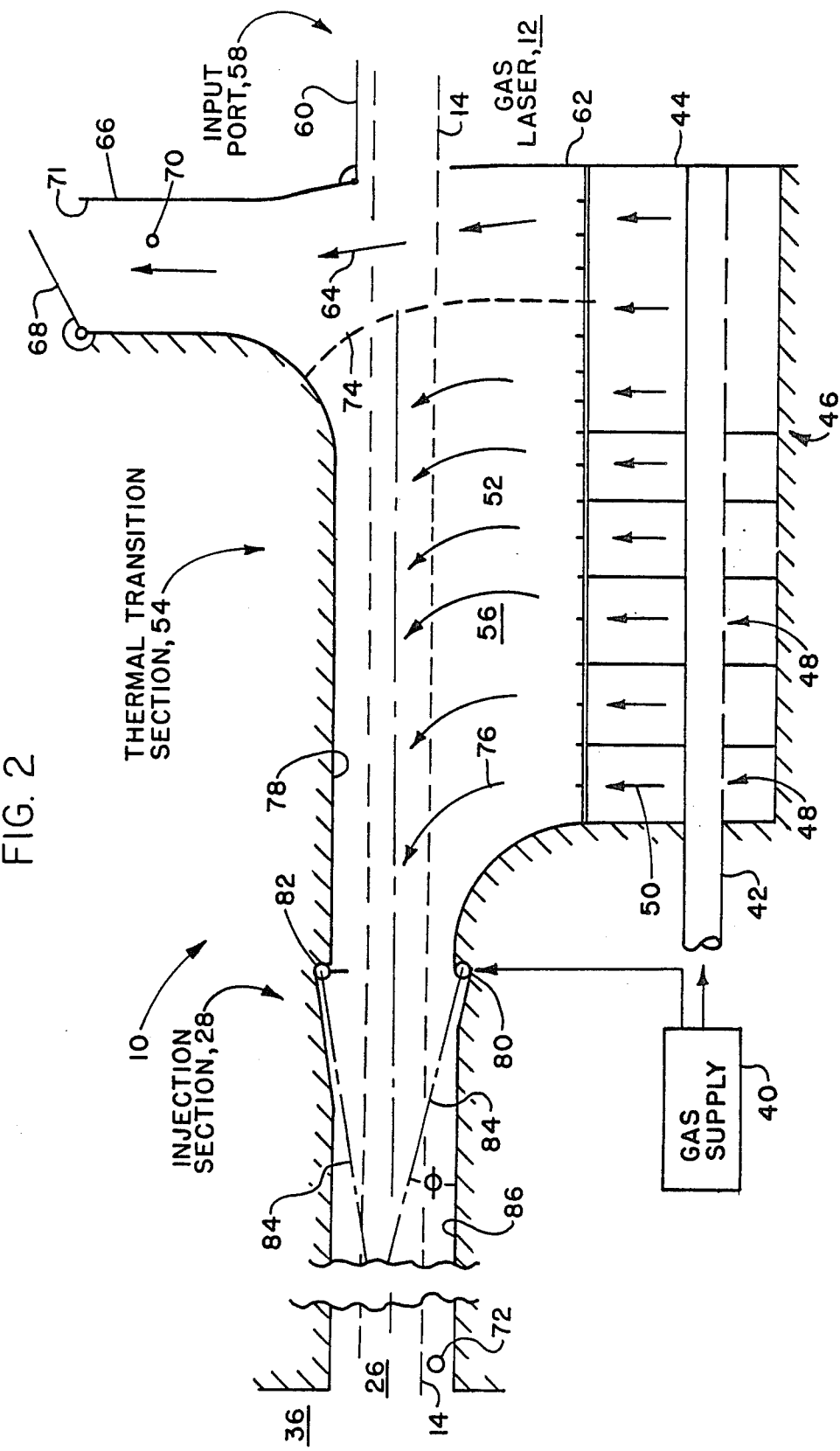
FIG. 2 illustrates by cross section an aerodynamic window of the present invention.

FIG. 2 illustrates by cross section the aerodynamic window 10. Aerodynamic window 10 has a gas supply 40 that outputs a pressurized gas such as nitrogen into a supply tube 42. Tube 42 outputs the pressurized gas into a manifold 44 having a plurality of compartments 46. Gas enters each compartment 46 by outlet ports 48 in tube 42.

There may be a plurality of outlet ports 48 in each compartment 46 so as to adjust the gas flow appropriately.

The gas flows in a vertical direction 50 and passes through a screen 52 which helps eliminate unstable conditions in the flow field. Other devices are clearly appropriate, such as curved vanes, etc.

In FIG. 2, a thermal transition section 54 has a flow chamber 56 connected directly above the manifold 44. Laser beam 14 enters through an input port 58 having a controllable door 60 mounted to a housing 62.

Since the amount of gas flowing into the injection section 28 is limited from flow chamber 56, excess gas and the gas from transverse flow 64 leave window 10 by an exhaust tube 66 also having a controllable door 68 with an opening 71.

A sensor 70 monitors the temperature and pressure therein and adjusts door 68 to maintain stable conditions therein. Additional sensors such as sensor 72 can monitor conditions in the system to adjust the gas supply 40, etc. Sensor 72 is placed in the injection section 28, for example.

A dividing streamline 74 separates the transverse flow 64 from an axial flow 76. It is clear from the FIG. 2 that turbulences occur along wall 78 but since beam 14 is not close to wall 78, the optical path differences will not be changed.

In order to increase the gas pressure and to further mix the gas because of heating from the laser beam 14, ejectors 80 and 82 are placed about the injection section 28. Although the ejectors 80 and 82 are shown oppositely located in FIG. 2 other locations may be selected for them, such as a location further up stream of laser beam 14 on wall 78. Ejectors 80 and 82 may be straight tubes having holes therein or an annular ring with holes therein for inputting jets 84. Additional ejectors may be placed in the injection section 28. Jets 84 are angled away from a wall 86 by an angle which should be greater than 15 degrees to prevent attachment of the jets 84 to the wall 86.

As seen in FIG. 1, the gas velocity, for example, increases from about one meter per second to about ten as a result of the pressure transition zone 88. The temperature remains basically the same after the temperature transition zone 20.

Clearly, many modifications and variations of the present invention are possible in light of the above teachings and it is therefore understood, that within the inventive scope of the inventive concept, the invention may be practiced otherwise than specifically claimed.

What is claimed is:

1. An aerodynamic window in conjunction with a high energy laser device, said aerodynamic window comprising a thermal transition section, said thermal transition section connected to a laser beam section from said high energy laser device, said laser beam section having a transverse gas flow, said thermal transition section having a gas flow field comprising a transverse flow and an axial flow, said flows being separated from each other by a dividing streamline, said thermal transition section having a temperature transition zone approximate to said transverse gas flow of said laser beam section, a temperature changing from said transverse gas flow and to said thermal transition section, said thermal transition section further comprising:

a manifold, said manifold receiving a supply of pressurized gas from a supply tube therein, said supply tube having a plurality of outlet ports therein, said manifold having a plurality of compartments located along said supply tube and each of said compartments receiving a pressurized gas from said outlet ports, said manifold having a flow stabilizer attached to open tops of the compartment;

a chamber, said chamber connected to said manifold, to said laser beam section of said laser, and to an injection section, said laser beam traversing said chamber, said laser beam entering said chamber through an openable door; and an exhaust tube, said exhaust tube being connected to said chamber proximal to said openable door and opposite to said manifold, said exhaust tube having a controllable door therein for controlling said transverse flow of gas therethrough, said exhaust tube being separated from a downstream portion of said chamber by said dividing streamline, said transverse flow from said manifold exiting through said exhaust tube; and said injection section, said injection section connected to said thermal transition section for receiving said laser beam and outputting said laser beam into an axial flow beam path, said injection section having a plurality of gas ejectors for causing a pressure transition zone proximal to said thermal transition section, said injection section increasing the gas velocity flow, mixing the gas in said injection section, and increasing the pressure in said injection section, said injection section further comprising:

a tube, said tube connected to said chamber of said thermal transition section for receiving said laser beam and said axial gas flow and connected to an output device, and a plurality of gas ejectors positioned in walls of said tube, said gas ejectors ejecting supplied pressurized gas in jets and at an acute angle to said walls whereby said gas is mixed, a pressure in said axial flow is increased, and said axial gas flow has an increased gas velocity.

2. An aerodynamic window as defined in claim 1 wherein said gas ejectors are oppositely located on said walls.

* * * * *